United States Patent
Borkar et al.

(10) Patent No.: US 9,783,933 B2
(45) Date of Patent: Oct. 10, 2017

(54) MODIFIED VINYLAMINE-CONTAINING POLYMERS AND THEIR USE IN PAPERMAKING

(71) Applicant: Solenis Technologies, L.P., Schaffhausen (CH)

(72) Inventors: Sachin Borkar, Wilmington, DE (US); Qu-Ming Gu, Bear, DE (US); Joseph M Mahoney, Newark, DE (US); Kate Marritt Lusvardi, Chadds Ford, PA (US); Mingxiang Luo, Hockessin, DE (US); Richard Riehle, Wilmington, DE (US)

(73) Assignee: Solenis Technologies, L.P. (CH)

( * ) Notice: Subject to any disclaimer, the term of this patent is extended or adjusted under 35 U.S.C. 154(b) by 0 days.

(21) Appl. No.: 15/154,238

(22) Filed: May 13, 2016

(65) Prior Publication Data

US 2016/0298297 A1 Oct. 13, 2016

Related U.S. Application Data

(63) Continuation-in-part of application No. 14/683,906, filed on Apr. 10, 2015.

(51) Int. Cl.
| | | |
|---|---|---|
| *D21H 21/20* | (2006.01) | |
| *D21H 21/18* | (2006.01) | |
| *D21H 17/37* | (2006.01) | |
| *C08F 271/00* | (2006.01) | |
| *C08F 271/02* | (2006.01) | |
| *C08F 8/00* | (2006.01) | |
| *C08F 8/44* | (2006.01) | |
| *D21H 17/41* | (2006.01) | |
| *D21H 17/45* | (2006.01) | |
| *D21H 21/10* | (2006.01) | |

(52) U.S. Cl.
CPC .......... *D21H 21/20* (2013.01); *C08F 8/00* (2013.01); *C08F 8/44* (2013.01); *C08F 271/00* (2013.01); *C08F 271/02* (2013.01); *D21H 17/375* (2013.01); *D21H 17/41* (2013.01); *D21H 17/45* (2013.01); *D21H 21/10* (2013.01); *D21H 21/18* (2013.01)

(58) Field of Classification Search
CPC ........ D21H 17/56; D21H 21/18; D21H 21/10; D21H 17/41; D21H 17/45; D21H 17/375; C08F 8/44; C08F 271/00; C08F 271/02; C08F 8/00
See application file for complete search history.

(56) References Cited

U.S. PATENT DOCUMENTS

| | | |
|---|---|---|
| 2,721,140 A | 10/1955 | Weisgerber |
| 4,421,602 A | 12/1983 | Brunnmueller et al. |
| 4,774,285 A | 9/1988 | Pfohl et al. |
| 5,039,757 A | 8/1991 | Takaki et al. |
| 5,578,678 A * | 11/1996 | Hartmann ............. C08F 251/00 525/54.3 |
| 5,630,907 A | 5/1997 | Nilz et al. |
| 5,698,627 A | 12/1997 | Oguni et al. |
| 5,753,759 A * | 5/1998 | Hartmann ............. B01F 17/005 525/218 |
| 5,938,937 A | 8/1999 | Sparapany et al. |
| 5,961,782 A | 10/1999 | Luu et al. |
| 5,994,449 A | 11/1999 | Maslanka |
| 6,060,566 A * | 5/2000 | Denzinger ............ C08F 261/04 524/504 |
| 6,159,340 A | 12/2000 | Niessner et al. |
| 6,294,645 B1 | 9/2001 | Allen et al. |
| 6,616,807 B1 | 9/2003 | Dyllick-Brenzinger et al. |
| 6,797,785 B1 | 9/2004 | Hund et al. |
| 7,323,510 B2 | 1/2008 | Fischer et al. |
| 7,902,312 B2 | 3/2011 | Gu et al. |
| 7,902,313 B2 | 3/2011 | Vos et al. |
| 8,518,215 B2 * | 8/2013 | McKay .................... C08F 8/44 162/158 |
| 8,604,134 B2 * | 12/2013 | Gu ........................ D21H 17/36 162/164.6 |
| 8,894,816 B2 * | 11/2014 | Borkar .................. C08F 226/02 162/164.6 |
| 2009/0043051 A1* | 2/2009 | Gu ........................ D21H 17/36 525/386 |
| 2010/0186914 A1 | 7/2010 | Jehn-Rendu et al. |
| 2010/0193148 A1* | 8/2010 | McKay .................... C08F 8/44 162/164.6 |
| 2010/0326614 A1 | 12/2010 | Hund et al. |
| 2011/0155339 A1* | 6/2011 | Brungardt ............. D21H 21/18 162/164.6 |
| 2013/0118699 A1* | 5/2013 | Borkar .................. C08F 226/02 162/164.6 |
| 2015/0299961 A1* | 10/2015 | Borkar ................. D21H 17/375 162/168.3 |
| 2016/0298297 A1* | 10/2016 | Borkar .................. D21H 21/20 |

FOREIGN PATENT DOCUMENTS

| | | | |
|---|---|---|---|
| EP | 3251182 B1 | 11/1991 | |
| EP | 2840100 A1 | 2/2015 | |
| EP | 2697270 B1 | 3/2015 | |
| WO | WO 2009017781 A2 * | 2/2009 | ............. D21H 17/36 |
| WO | WO 2010088473 A1 * | 8/2010 | ................ C08F 8/44 |

OTHER PUBLICATIONS

International Bureau of WIPO, International Preliminary Report on Patentability in International Application No. PCT/US2015/025406, dated Oct. 18, 2016.

Tanaka et al., "Preparation of Cationic Polyacrylamides by a Modified Hofmann Reaction: Fluorescent Labeling of Cationic Polyacrylamides", J Polym Sci, Part A, vol. 27, pp. 4329-4339, 1989.

\* cited by examiner

*Primary Examiner* — Jose Fortuna

(74) *Attorney, Agent, or Firm* — Michael J. Herman; Joanne Rossi

(57) ABSTRACT

Provided is a method of making paper and paperboard. In particular graft copolymers of vinyl monomers and functionalized vinylamine-containing base polymers by Michael addition are added to a paper furnish. The composition can be used alone or in combination with other additives for use in paper making and to improve paper making processes such as paper dry and wet strength properties.

10 Claims, No Drawings

MODIFIED VINYLAMINE-CONTAINING POLYMERS AND THEIR USE IN PAPERMAKING

This application is a Continuation-In-Part to co-pending U.S. patent application Ser. No. 14/683,906, filed Apr. 10, 2015, which claims the benefit of and priority to U.S. Provisional Application Ser. No. 61/980,336, filed Apr. 12, 2014, both of which are incorporated by reference herein in their entirety.

FIELD OF INVENTION

Provided is a method of making paper and paperboard. In particular graft copolymers of vinyl monomers and functionalized vinylamine-containing base polymers by Michael addition are added to a paper furnish. The composition can be used alone or in combination with other additives for use in paper making and to improve paper making processes such as paper dry and wet strength properties.

BACKGROUND OF THE INVENTION

The ability of water soluble polymers, with polar functionality, to hydrogen bond with cellulose fibers makes them suitable candidates for the paper industry. Use of functional polymers has shown improvement in paper making processes with regard to paper strength, drainage, retention and several other properties. Several patents and research articles discuss the use of functional polymers as a paper making additive. Functional polymers that are added as strength additives at the wet-end of the paper machine, especially in paper made from recycled fibers, include amphoteric acrylamide based polymers and coacervate technology. An example of the former is described in U.S. Pat. No. 5,698,627, issued to Oguni, which teaches the synthesis of acrylamide based amphoteric copolymers that improve freeness, retention, and dry strength of recycled corrugated base paper. An example of coacervate technology is described in U.S. Pat. No. 6,294,645. This wet-end dry strength system is comprised of a low charge polyamidoamine-epichlorohydrin and an anionic polyacrylamide, added sequentially to pulp slurry.

Polymers with amine functionality, such as vinylamine based polymers derived from N-vinylformamide (VFA), offers a material with distinctive properties. The pendant primary amine functionality generated on VFA hydrolysis makes these polymers highly cationic in nature. U.S. Pat. No. 2,721,140 discloses use of polyvinylamine as an additive to make papers having high wet strength, while U.S. Pat. No. 5,961,782 discloses the use of polyvinylamine to make crosslinked creping adhesive formulations.

U.S. Pat. No. 4,421,602 discloses a partially hydrolyzed, water-soluble polymer of N-vinylformamide that contains N-vinylformamide units and vinylamine units. It also discloses use of polyvinylamine and a 50% hydrolyzed polyvinylformamide to increase flocculation efficiencies, fines retention, and the drainage rate of pulp fiber in papermaking processes, while U.S. Pat. No. 6,159,340 discloses the use of such polymers as dry and wet strength additives in paper and paperboard production. U.S. Pat. No. 6,616,807 and U.S. Pat. No. 6,797,785 disclose use of polyvinylamines as drainage aids, flocculants, and retention aids in the paper making. As used herein vinylamine-containing polymer and polyvinylamine are used interchangeably.

Similarly copolymers of N-vinylformamide with functional vinyl monomers are also well studied. U.S. Pat. No. 4,774,285 discloses that N-vinylformamide monomer may be copolymerized with an additional vinyl monomer, e.g., vinyl acetate, and subsequently hydrolyzed to produce a water-soluble copolymer of vinylamine and vinyl alcohol, which may be used as wet and dry strength additives for papermaking. U.S. Pat. No. 5,630,907 discloses copolymer compositions containing vinyl amine and acrylic acid units, as well as their applications. U.S. Pat. No. 6,797,785 discloses copolymers containing vinylamine units in combination with either diallyldimethylammonium (chloride) (DADMAC) or acrylamide units via reverse emulsion polymerization, and their use as flocculants and coagulants in papermaking. EP 0251182 discloses copolymers containing vinylamine and acrylonitrile units for use in papermaking as drainage aids, retention aids, as well as wet end additives for increasing the dry strength of paper products.

Hofmann degradation of polyacrylamides is another approach to introduce primary amine functionality to polymers. Tanaka and Ödberg, in J. Polym. Sci. Part A: Polymer Chemistry 1989, (27) 4329-4339, describes a method of preparing polyvinylamine via a Hofmann reaction of polyacrylamide. U.S. Pat. No. 5,039,757 discloses manufacturing of cationic polyacrylamide by Hofmann degradation process using polyacrylamides and its copolymers. US Patent Application No. 2010/186,914 A1 and US Patent Application No. 2010/326,614 A1 disclose use of branched acrylamide copolymers and its subsequent Hofmann degradation to introduce primary amine functionality. However, use of hypohalogenite under alkaline conditions also results in hydrolysis of acrylamide functionality, and polymer degradation. Further purification of the polymer to remove residual hypohalogenite makes this approach expensive.

Modification of vinylamine based polymers is another approach to introduce additional functionality to the polymer and alter its physical properties. U.S. Pat. No. 8,604,134 discloses modification of polyvinylamine with different functional groups and its application as paper making additive. U.S. Pat. No. 7,902,312 discloses Michael adduct of polyvinyl amine with $\alpha,\beta$-unsaturated alkyl carbonyl compounds and its subsequent use as an additive for paper making system. U.S. Pat. No. 5,994,449 discloses the use of vinylamine-vinyl alcohol copolymer functionalized with epichlorohydrin and its mixture with polyaminoamide as creping adhesive for paper application.

Graft copolymers of vinylamine based polymers is disclosed in U.S. Pat. No. 5,753,759. The disadvantage of this technology is that the pH and temperature conditions employed for graft polymer synthesis promotes side reactions leading to an unstable product and/or the unwanted Michael addition reaction of the grafting monomer on vinylamine base polymer, and/or product with very limited shelf life.

US patent application publication 2011/0155339 teaches a process for enhancing dry strength of paper by treatment with vinylamine-containing polymers and acrylamide-containing polymers. US 2011/0155339 describes a single-product blend that can react in aqueous solutions with primary amine groups in the vinylamine-containing polymer to form amide groups which may form a gelled or prohibitively high viscosity product which causes issues in papermaking.

The present invention relates to a process of graft polymerization of vinyl monomer based on a functionalized vinylamine-containing polymer and compositions thereof. Such a graft polymerization results in a stable copolymer with essentially no added graft monomer on the functionalized vinylamine-containing polymer via Michael addition and provides a polymer of different chemical and physical properties compared with other linear polymers.

Vinylamine-containing polymers and aldehyde functional polymers are widely used in the paper making industry to improve drainage and dry strength. U.S. Pat. No. 6,824,650 describes a paper product using a combination of a polyvinylamine polymer and a polymeric aldehyde functional compound to form a polyelectrolyte complex that provides a significant dry tensile increase and wet strength levels roughly additive with the individual components.

All references cited in this application are incorporated herein in their entirety.

SUMMARY OF THE INVENTION

The present invention relates to a composition of graft copolymers of vinyl monomers and functionalized vinylamine-containing base polymers by Michael addition. The present invention also relates to a process of making the graft copolymers. The resulting aqueous graft copolymers can be used as a cost effective paper making additive to improve paper making processes and paper dry strength properties.

The present composition is also envisioned as being useful as a retention aid, deposit control and/or fixative agent, coagulant in paper making processes, flocculant in waste water treatment, plasticizers, viscosity modifier, personal care additive, coating material, slow releasing carriers for various industrial applications.

This also relates to a functionalized vinylamine-containing polymer wherein the functionalized vinylamine polymer is obtained by Michael addition reaction with α,β-unsaturated alkyl carbonyl compounds such as α,β-unsaturated alkyl amides, esters and acids. These functionalized polymers are then subjected to free radically initiated graft polymerization (for more on graft polymerization see, for example, "www.cmu.edu/maty/materials/Synthesis_of_well_defined_macromolecules/graft-copolymers") using a vinyl monomer and the functionalized vinylamine-containing polymer as a base polymer. The amount of α,β-unsaturated alkyl carbonyl compounds, based on the vinylamine-containing polymer can be from about 0.1 mole % to about 30 mole %, can be from about 0.2 mole % to about 20 mole %, can be from about 0.5 mole % to about 10 mole %, and may be in the range of from about 1 mole % to about 4 mole %. The molar ratio of functionalized vinylamine base polymer obtained via Michael addition to a vinyl monomer for graft polymerization can be varied from about 40:60 to about 80:20, can be from about 20:80 to about 60:40, can be from about 10:90 to about 50:50, and may be from about 5:95 to about 20:80.

The graft copolymer described herein can be used, for example, to improve dry strength, wet strength, drainage, fixative, flocculation and sizing properties of paper when used as an additive in the papermaking process and has many other potential applications, such as, a retention aid, deposit control and/or fixative agent, coagulant in paper making processes, flocculant in waste water treatment, plasticizers, viscosity modifiers, personal care additive, coating materials, slow releasing carriers for various industrial applications.

The present invention relates to use of aldehyde functionalized polymers in combination with interpenetrating network or graft copolymer of acrylamide and a vinylamine-containing polymer for paper and papermaking to provide increased permanent wet strength. Additionally, this combination used in tissue and towel paper products provides improved dry strength, drainage, formation, softness and reduced dusting and linting. In packaging paper grades, this combination provides improved dry strength, drainage, formation, and ply bond strength.

DETAILED DESCRIPTION OF THE INVENTION

In one embodiment, the present invention relates to a graft copolymer composition of a vinyl monomer and a functionalized vinylamine-containing base polymer wherein the functionalized vinylamine-containing base polymer comprises randomly distributed repeating monomer units having the formula (I), (II) and (III),

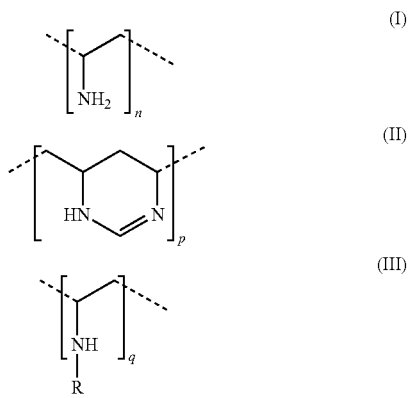

wherein R is a reacted α, β-unsaturated alkyl carbonyl compound through Michael addition by vinylamine in the polymer; n, p and q are the numbers indicating mole % of the repeating units of formula (I), (II) and (III) present in the functionalized vinylamine-containing polymer; and wherein n can be from about 5 mole % to about 98 mole %, p can be from about 1 mole % to about 80 mole %, q can be from about 1 mole % to about 30 mole %; wherein the mole ratio of the functionalized vinylamine-containing polymer to the vinyl monomer in the graft polymer is in the range of from about 40:60 to about 80:20, can be from about 20:80 to about 60:40, can be from about 10:90 to about 50:50, and may be from about 5:95 to about 20:80.

In one embodiment, the α,β-unsaturated alkyl carbonyl compounds used to make functionalized vinylamine-containing polymer via Michael addition include, for example, acrylamide, methacrylamide, t-butyl acrylamide, N-alkylacrylamide, N-alkylmethacrylamide, N-[3-(propyl)trimethylammonium chloride]acrylamide, N-[3-(propyl)trimethylammonium chloride]methacrylamide, methyl acrylate, alkyl acrylate, methyl methacrylate, alkyl methacrylate, aryl acrylate, aryl methacrylates, [2-(methacryloyloxy)ethyl]-trimethylammonium chloride, N-[3-(dimethylamino)propyl]acrylamide, N-[3-(dimethylamino)propyl]methacrylamide, N-ethylacrylamide, 2-hydroxyethyl acrylate, acrylonitrile, vinylpyridine, acrylamidopropyltrimethylammonium chloride and combinations thereof.

In another embodiment, the vinyl monomer used in the current process can be acrylamide, acrylic acid, methacrylamide, methyl methacrylate, acrylonitrile, methyl acrylate, alkyl methacrylate, N-(2-methylpropanesulfonic acid)acrylamide, N-(glycolic acid)acrylamide, N-[3-(propyl)trimethylammonium chloride]acrylamide, and combinations thereof; and may be acrylamide, methacrylamide, methyl methacrylate and combinations thereof.

In one another embodiment the α,β-unsaturated alkyl carbonyl compound is acrylamidopropyltrimethylammonium chloride and the vinyl monomer is acrylamide.

In yet another embodiment, the graft copolymer is a functionalized vinylamine-containing base polymer that comprises repeating units of formula (I), (II) and (III) wherein n is from about 50 mole % to 98 mole %, p is from about 1 mole % to about 30 mole % and q is from 1 mole % to about 15 mole %, wherein the vinyl monomer is acrylamide, wherein the mole ratio of the functionalized vinylamine-containing base polymer to acrylamide is from about 10:90 to about 50:50.

In another embodiment, the graft copolymer comprises a functionalized vinylamine-containing polymer that comprises repeating units of formula (I), (II) and (III), wherein n is from about 80 mole % to 98 mole %, p is from about 1 mole % to about 15 mole % and q is from about 1 mole % to about 8 mole %, the vinyl monomer is acrylamide, wherein the mole ratio of the functionalized vinylamine-containing polymer to acrylamide is from about 5:95 to about 20:80.

Without wishing to be limited by theory, vinylamine repeating units in the vinylamine-containing polymer possess one primary amine and all of the vinylamine repeating units can theoretically be functionalized via Michael addition. However, too much functionalization of the vinylamine polymer can result in excess grafting and crosslinking of the graft copolymer. The graft copolymer of the present composition should have less than 30 mole % of the primary amine functionalized.

The primary amine groups of the vinylamine repeating units on polyvinylamine are believed to be the active agents for wet strength. Functionalization of vinylamine-containing polymer via Michael addition can result in a decrease in primary amine content in the base polymer and also in the graft copolymer. For certain paper products, such as bath tissue, higher dry tensile and lower wet tensile properties are desirable.

In an embodiment, the amount of α,β-unsaturated alkyl carbonyl compounds, based on vinylamine-containing polymer, is less than about 30 mole %, can be less than 20 mole %, and may be less than 10 mole % to produce the Michael adduct. The ratio of the Michael adduct of the vinylamine-containing polymer to a vinyl monomer for graft polymerization can be varied from about 40:60 to about 80:20, can be from about 20:80 to about 60:40, can be from about 10:90 to about 50:50, and may be from about 5:95 to about 20:80.

In another embodiment, a process of preparing a composition through a free radically initiated graft polymerization of a vinyl monomer based on a functionalized vinylamine-containing base polymer, the process comprises the step of (1) dissolving a functionalized vinylamine-containing polymer in a media, such as water, an ionized solution, a solvent or combinations thereof, (2) adjusting the pH to from about 1 to about 4, can be from about 2 to about 4, can be about 3.0 to about 3.8, and may be from about 3.2 to about 3.6, and (3) conducting free radical polymerization at a temperature of from about 30° C. to about 100° C., can be from about 40° C. to about 80° C., and may be from about 55° C. to about 75° C., for from about 10 minutes to about 300 minutes, can be from about 30 minutes to about 150 minutes, and may be from about 40 minutes to about 80 minutes.

In another embodiment free radical polymerization is conducted at a pH of from about 3.0 to about 3.8; at a temperature of from about 40° C. to about 80° C. for about 40 minutes to about 80 minutes.

In yet another embodiment, the functionalized vinylamine-containing polymer is present in a reaction medium in an amount of from about 0.1% to about 20% active solids, can be from about 1% to about 15% active solids, can be from about 2% to about 10% active solids, and may be from about 3% to about 8% active solids.

In yet another embodiment, a method of making a graft copolymer composition using a vinylamine-containing base polymer, wherein the base polymer comprises randomly distributed repeating monomer units having the formula (I) (II) and (III):

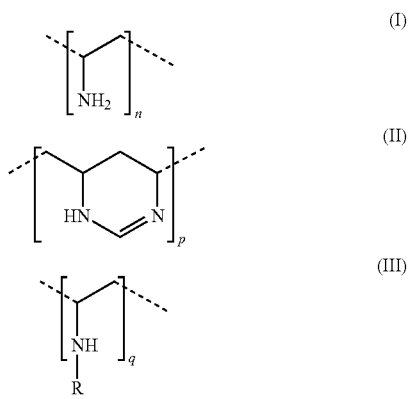

wherein R is a reacted α,β-unsaturated alkyl carbonyl compound through Michael addition by vinylamine; n, p and q indicate the mole percent (mole %) of the repeating units of formula (I), (II) and/or (III) present in the functionalized vinylamine-containing polymer; wherein n is from about 5 mole % to about 99 mole %, p is from about 1 mole % to about 80 mole %, q can be from 0 mole % to about 30 mole %.

In an embodiment, initiators can be used in the current process to produce the graft copolymers of vinyl monomers and the functionalized vinylamine-containing base polymers, such as hydrogen peroxide, tert-butyl hydroperoxide (TBHP), sodium, potassium or ammonium persulfates, azo initiators, and redox initiator systems.

In one embodiment, the initiator is hydrogen peroxide or tert-butyl hydroperoxide (TBHP).

Another embodiment of the present invention is the aforementioned process with a proper selection of the initiator and polymerization temperature in combination, wherein said initiator is hydrogen peroxide, tert-butyl hydroperoxide, and sodium, potassium or ammonium persulfates, can be hydrogen peroxide, tert-butyl hydroperoxide, and may be hydrogen peroxide, wherein the temperature for the graft polymerization can be from about 40° C. to about 90° C., can be from about 50° C. to about 80° C., and may be from about 60° C. to about 70° C.

In yet another embodiment, a hydrogen peroxide initiator is added to the aqueous medium and polymerization is carried out at a pH of from about 3.0 to about 3.8; at a temperature of from about 40° C. to about 80° C. for from about 40 minutes to about 80 minutes.

In other embodiments, the vinylamine-containing polymers used in the current process include, but is not limited to, partially or completely hydrolyzed poly(N-vinylformamide), copolymers of N-vinylformamide and vinylamine, copolymers of vinylamine and amidine, copolymers of N-vinylacetamide and vinylamine, terpolymers of N-vinylformamide, vinylamine and amidine, terpolymers of N-vinylformamide, vinylamine and vinylamine methyl chloride quaternary ammonium salts, terpolymers of N-vinylformamide, vinylamine and vinyl alcohol, terpolymers of N-vinylformamide, vinylamine and vinyl acetate, terpolymers of N-vinylformamide, vinylamine and acrylamide, terpolymers of N-vinylformamide, vinylamine and acrylate, terpolymers of N-vinylformamide, vinylamine, and diallyldimethyl ammonium chloride, terpolymers of N-vinylformamide, vinylamine, and vinyl trimethoxysilane, copolymers of N-vinylamine and vinyl alcohol, copolymers of N-vinylamine and diallyldimethylammonium chloride, copolymers of N-vinylamine and acrylic acid, and combinations thereof.

In one embodiment, the molecular weight ($M_w$) of the functionalized vinylamine-containing base polymer can range from about 2,000 to about 1,000,000 Daltons, can be from about 4,000 to about 800,000 Daltons, can be from about from 10,000 to 500,000 Daltons, and may be from about 50,000 to about 400,000 Daltons.

In another embodiment, the molecular weight ($M_w$) of the graft copolymer can be in the range of from about 4,000 to about 2,000,000 Daltons, can be from about 6,000 to about 1,000,000 Daltons, can be from about 100,000 to about 700,000 Daltons, and may be from about 100,000 to 400,000 Daltons.

In another embodiment, a method of producing a graft copolymer comprising a vinylamine-containing base polymer in an aqueous medium and reacting the base polymer with vinyl monomers at a pH of from about 1.0 to about 4.0 and a temperature of from about 30° C. to about 100° C. for about 10 to 300 minutes, can be about 30 minutes to 150 minutes and may be from about 40 minutes to about 80 minutes.

In yet another embodiment, the functionalized vinylamine-containing base polymer is present in a reaction medium in an amount of from about 0.1% to about 20% active solids, can be from about 1% to about 15% active solids, can be from about 2% to about 10% active solids, and may be from about 3% to about 8% active solids.

Without wishing to be bound by theory, the graft copolymers of acrylamide and the functionalized vinylamine-containing base polymers of the present invention may undergo chemical self-crosslinking under various conditions, resulting in a change in physical and chemical properties to form a gel or a high viscosity, high molecular weight polymer. Typical examples are the transamidation of vinylamine with polyacrylamide and formation of polyelectrolyte of the amines with anionic moieties derived from amides.

The graft copolymers of a vinyl monomer and a functionalized vinylamine-containing base polymer of the present invention can be used in papermaking as a dry strength additive to improve paper and paperboard dry strength, to accelerate drainage of the pulp fiber and to increase the retention of fines and fillers by the pulp fibers in the papermaking process.

Also provided is a method for improving permanent wet strength of paper by combining aldehyde functionalized polymers in combination with interpenetrating network or graft copolymer of acrylamide and a vinylamine-containing polymer for paper. It has surprisingly been discovered that this combination will synergistically provide permanent wet strength greater than the additive effect of the separate chemistries. The higher level of permanent wet strength provides paper tissue products that are less dispersible.

In is also envisioned that the present composition could be used as a retention aid, deposit control and/or fixative agent, coagulant in paper making processes, flocculant in waste water treatment, plasticizer, viscosity modifier, personal care additive, coating material, and slow releasing carriers for various industrial applications.

The graft copolymers of acrylamide and the functionalized vinylamine-containing polymers of the present invention provided improved dry strength properties of paper products when compared with a polyacrylamide derivative such as glyoxalated polyacrylamide and commercial cationic starch. It was found that the graft copolymers of the invention were more effective at treatment levels from about 0.01 active wt. % to about 0.5 active wt. % based on the weight of the dry pulp relative to the glyoxalated polyacrylamide derivative. The paper products made with the composition of the present invention had lower permanent wet strength than those made with polyvinylamine and glyoxalated polyacrylamide.

In yet another embodiment, the graft copolymers of the present invention can be used in combination with other compositions or additives in order to improve the physical and application properties of the graft copolymers. The graft copolymers can be used in combination with a cationic polymer such as crosslinked polyamidoamines, polydiallyldimethylammonium chlorides, and polyamines. If the graft copolymers contains anionic functionality, they could be used in combination with a cationic polymer such as crosslinked polyamidoamines, polydiallyldimethylammonium chlorides, and polyamines to form a polyelectrolyte complex thus improving the strength properties of paper products. Additionally, the combination of the graft copolymers of the present invention can be used in combinations with an anionic polymer, and optionally with a cationic polymer, to form a polyelectrolyte complex thus improving the strength properties of paper products. Anionic polymers include, but are not limited to, a copolymer containing acrylic acid, a copolymer of acrylamide and acrylic acid, or a carboxylmethyl cellulose. For example, Hercobond™ 2000 or Hercobond™ 2800 dry-strength additives (copolymers of acrylamide and acrylic acid, available from Solenis LLC, Wilmington, Del.). Additionally, the combination of the graft copolymers of the present invention can be used in combinations with another cationic polymer thus improving the strength properties of paper products. For example, the combination of a Kymene™ wet-strength resin (a crosslinked polyamidoamine resin, available from Solenis LLC, Wilmington, Del.) and the graft copolymers of the present invention can provide improved wet and dry strength.

In yet another embodiment, the graft copolymers of the present invention can be used in combination with other additives in order to improve the physical and application properties of the graft copolymer. The additives can be aqueous dispersions such as those described in U.S. Pat. No. 5,938,937. These types of dispersions are commonly referred to as "brine dispersions." U.S. Pat. No. 5,938,937 teaches that various combinations of low molecular weight highly cationic dispersion polymers and elevated inorganic salt content can be effective in producing a cationic aqueous dispersion polymer. Yet other aqueous dispersions are described in U.S. Pat. No. 7,323,510, which teaches that an aqueous dispersion of a cationic amide-containing polymer can be made wherein the dispersion has a low inorganic salt content. A dispersion of this type is generally composed of two different polymers: (1) A highly cationic dispersant polymer of a lower molecular weight ("dispersant polymer"), and (2) a less cationic polymer of a higher molecular weight that forms a discrete particle phase when synthesized under particular conditions ("discrete phase"). Perform™ PK2350 and Perform™ PK2320 are products available from Solenis LLC that are aqueous dispersions of a cationic amide-containing polymer with a low inorganic salt content.

It has been surprisingly discovered that aqueous dispersions of a cationic amide-containing polymer can be blended with the vinylamine-containing graft copolymers of the present invention to form a composition that is not gelled nor is prohibitively high viscosity. The present invention blend provides enhanced drainage in addition to enhanced dry strength. The ratio of the aqueous dispersion of a cationic amide-containing polymer to the vinylamine-containing graft copolymers can be varied from 2:98 to about 40:60, can be from about 3:97 to about 30:70 and may be from about 5:95 to about 20:80. The molar ratio of functionalized vinylamine base polymer to a vinyl monomer for graft polymerization can be varied from about 5:95 to about 40:60, can be from about 10:90 to about 30:70, and may be from about 5:95 to about 20:80.

The method also provides for improving the formation of paper with; (1) an interpenetrating network or graft copolymer of acrylamide and a vinylamine-containing polymer for paper or (2) with a combination of aldehyde functionalized polymers with interpenetrating network or graft copolymer of acrylamide and a vinylamine-containing polymer for paper. Improving the formation can increase the dry strength and wet strength of a paper product, especially a tissue or towel product.

The method also provides improving the ply bond strength of paper and paperboard by combining aldehyde functionalized polymers in combination with a graft copolymer of acrylamide and a vinylamine-containing polymer for paper. It has surprisingly been discovered that a combination of the two (including spray application and/or wet-end addition) will synergistically provide ply bond strength greater than the additive effect of the separate chemistries.

In the following examples, size exclusion chromatography (SEC) was used to measure molecular weight. The analysis was accomplished using gel permeation columns (CATSEC 4000+1000+300+100) and Waters 515 series chromatographic equipment with a mixture of 1% $NaNO_3$/0.1% Trifluoroacetic acid in 50:50 $H_2O:CH_3CN$ as the mobile phase. The flow rate was 1.0 milliliter per minute (ml/min). The detector was a Hewlett Packard 1047A differential refractometer. Column temperature was set at 40° C. and the detector temperature was at 35° C. The number average (Mn) and weight average molecular weight (Mw) of the polymers were calculated relative to the commercially available narrow molecular weight standard poly(2-vinyl pyridine).

The term "active" polymer as used herein represents the total weight of the polymer as a percentage of a solution of all the monomers and modifying compounds used for making such a polymer on dry wt. basis.

Brookfield viscosity (BV) was measured using a DV-II Viscometer (Brookfield Viscosity Lab, Middleboro, Mass.). A selected spindle (number 2) was attached to the instrument, which was set for a speed of 30 RPM. The reaction solution is prepared at a specific active polymer content (see Tables I, II and III). The Brookfield viscosity spindle was carefully inserted into the solution so as not to trap any air bubbles and then rotated at the above-mentioned speed for 3 minutes at 24° C. The units are given in centipoise (cps).

The drainage activity of the invention was determined utilizing a modification of the Dynamic Drainage Analyzer, test equipment available from AB Akribi Kemikonsulter, Sundsvall, Sweden. The modification consists of substituting a mixing chamber and filtration medium with both smaller sample volume and cross-sectional area to the machine. A 250 milliliter (ml) sample volume at 0.3% consistency and a 47 millimeter (mm) cross-sectional filtration diameter (60-mesh screen) were used in these tests. The test device applies a 400 mbar vacuum to the bottom of the separation medium. The device electronically measures the time between the application of vacuum and the vacuum break point, i.e. the time at which the air/water interface passes through the thickening fiber mat. Results are given as drainage time with a lower drainage time is preferred. A drainage index (DI) can be calculated as the drainage time for the control system with no additives divided by the time it takes for the system with additives. Therefore, a higher DI demonstrates an improvement in drainage.

The drainage testing was performed on paper pulp that was a blend of 25% unbleached softwood Kraft and 75% recycled medium with 50 parts-per-million (ppm) hardness, 25 ppm alkalinity, 2.5% GPC D15F oxidized starch (Grain Processing Corp., Muscatine, Iowa) and 2000 microSeimen per centimeter (µS/cm) conductivity. The system pH was 7.0 and the pulp freeness was about 400 CSF for the Kraft fiber and 300 CSF for the recycled medium.

These and other embodiments are defined in the following Examples. It should be understood that these Examples are given by way of illustration only. Thus various modifications in addition to those shown and described herein will be apparent to those skilled in the art. Although the invention has been described with reference to particular means, materials and embodiments, it is to be understood that the invention is not limited to the particulars disclosed, and extends to all equivalents within the scope of the appended claims.

EXAMPLES

The following examples demonstrate the graft polymers of the current composition helps to improve dry strength, wet strength, retention, and drainage properties of the paper when the composition is used as an additive during paper making processes. These examples and the data presented below better illustrate the benefits of the current composition and are not meant to be limiting.

Example 1. Graft Copolymer of Acrylamide and Acrylamidopropyltrimethyl Ammonium Chloride (APTAC) Functionalized Polyvinylamine (PVAm/APTAC-g-PAM)

The following example represents a general procedure for making the graft copolymers according to the present invention.

Acrylamidopropyltrimethylammonium chloride (APTAC) functionalized polyvinylamine was made using similar procedure described in Example 1 of U.S. Pat. No. 7,902,312. As a typical example, a solution of polyvinylamine (100 grams (g), 14.0% active solids) was added to a 1 liter (L) reaction flask and was adjusted to pH 11.3-11.5 using 50% NaOH. Acrylamidopropyltrimethylammonium chloride solution (1.63 grams (g) active solids) was added drop wise at 60° C. for 20 minutes. The resulting mixture was stirred at 60° C. for 2 hours to give an acrylamidopropyltrimethylammonium chloride functionalized polyvinylamine.

A solution of the functionalized polyvinylamine prepared using above procedure was diluted to achieve desired target active solids in the range from 10% to 24% and adjusted to pH 3.6 by adding 37% hydrochloric acid under stirring and purged with nitrogen gas for 30 minutes. Ferrous sulfate heptahydrate solution (2 g, 1%) was added and the temperature of the resulting solution was raised to 60° C. Acrylamide (75.60 g active solids) was drop wise added over 60 minutes under stirring while simultaneously adding 30.0 g of hydrogen peroxide solution (5%) over a 90 minute time period. The reaction was held at 60° C. to 65° C. for 1 hour after hydrogen peroxide addition was completed. The reaction solution was then cooled to ambient temperature and the pH adjusted to 5.0 using sodium hydroxide (50% by wt).

Examples 1-1 to 1-6 were compositions prepared as described in Example 1 using different molar percent of acrylamidopropyltrimethylammonium chloride (APTAC) to polyvinylamine and different molar ratios of the functionalized polyvinylamine to acrylamide. The conditions and analytical results are summarized in Table I.

TABLE I

Polyacrylamide graft APTAC functionalized polyvinylamine

| Examples | APTAC (mole % vs Polyvinylamine) | Polyvinylamine/ Acrylamide (molar ratio) | Viscosity (cps) | Mw | Active polymer % |
|---|---|---|---|---|---|
| 1-1 | 4 | 10:90 | 870 | 186,000 | 13.2 |
| 1-2 | 4 | 14:86 | 1320 | 184,500 | 13.8 |
| 1-3 | 4 | 16:84 | 780 | 215,300 | 13.6 |
| 1-4 | 1 | 16:84 | 630 | 200,000 | 17.3 |
| 1-5 | 1 | 15:85 | 530 | 128,000 | 20.8 |
| 1-6 | 1 | 14:86 | 360 | 100,000 | 21.7 |

Example 2, represents a general procedure for making the current copolymers via simultaneous addition of a monomer acrylamide and an initiator. A solution of a polyvinylamine as the base polymer for the graft polymerization was diluted to achieve desired target active solids in the range from 10% to 24% and adjusted to pH 3.6 by adding 37% hydrochloric acid while stirring and purged with nitrogen gas for 30 minutes. Ferrous sulfate solution (300 ppm based on acrylamide) was added and temperature was raised to 70° C. An acrylamide was added drop wise over 60 minutes under stirring while simultaneously adding a hydrogen peroxide solution (0.5 w/w % based on acrylamide) over 90 minutes. The reaction was held at 70° C. for 1 hour after the hydrogen peroxide addition was completed. The reaction solution was then cooled to ambient temperature and the pH of the solution was adjusted to 5.0 using sodium hydroxide (50%).

Examples 2-1 to 2-2 were the compositions prepared as described in Example 2 using different molar percent of polyvinylamine to acrylamide. These two compositions were also used as comparative examples to compare with the compositions from Example 1 for dry strength performance on paper sheets.

TABLE II

Polyacrylamide graft polyvinylamine via process A

| Examples | Polyvinylamine/ Acrylamide (molar ratio) | Viscosity (cps) | Mw | Active polymer % |
|---|---|---|---|---|
| 2-1 | 10:90 | 595 | 92800 | 14.0 |
| 2-2 | 15:85 | 366 | 123000 | 13.5 |

Example 3, represents a one pot reaction procedure of making the current graft copolymers. A solution of polyvinylamine as the base polymer for the graft polymerization was added to a reaction flask and diluted to achieve desired target active solids in the range from 10% to 24%, and the pH adjusted to 3.6 by adding 37% hydrochloric acid under stirring. An acrylamide was added to the solution with stirring and purged with nitrogen gas for 30 minutes. Ferrous sulfate solution (300 ppm based on acrylamide) was added to the purges solution and the temperature was adjusted to 70° C. A hydrogen peroxide solution (0.5 w/w % based on acrylamide) was drop wise added over 120 minutes. The reaction was held at 70° C. for 30 minutes after hydrogen peroxide addition was completed. The reaction solution was then cooled to ambient temperature and pH was adjusted to 5.0 using sodium hydroxide (50%). Due to the exothermic nature of acrylamide polymerization this one pot reaction procedure works best for synthesis of graft polymers containing more than 30% of polyvinylamine.

Examples 3-1 to 3-3 use the compositions prepared as described in Example 2, using different molar percent of polyvinylamine to acrylamide. The conditions and analytical results are summarized in Table III.

TABLE III

Polyacrylamide graft - polyvinylamine via process B

| Examples | Polyvinylamine/ Acrylamide (molar ratio) | Viscosity (cps) | Mw | Active polymer % |
|---|---|---|---|---|
| 3-1 | 20:80 | 7870 | 240000 | 13.1 |
| 3-2 | 25:75 | 19376 | 336000 | 12.8 |
| 3-3 | 50:50 | 307 | 336000 | 12.7 |

Comparative Example 1. A Blended Composition of a Polyacrylamide (Perform®PC8134, from Ashland Incorporated, Wilmington, Del., USA) with Polyvinylamine at 80:20 wt/wt Ratio Based on Polymer Active Example 4, illustrates the dry strength properties of paper sheets made with the graft copolymer of acrylamide and polyvinylamine and APTAC functionalized polyvinylamine of the above examples were compared with the dry strength properties of paper sheet made with a benchmark dry strength resin glyoxalated polyacrylamide (GPAM) (Hercobond™ 1000, from Ashland Incorporated, Wilmington, Del., USA). The paper was made using a papermaking machine located at 500 Hercules Rd., Wilmington Del. The paper pulp was 70% Quinessec hardwood bleached Kraft and 30% Rayonier softwood bleached Kraft refined separately using Andritz double desk refiner to 500 ml CSF freeness and then mixed to produce a pulp with 100 ppm hardness and 50 ppm alkalinity. The system pH was 7.0 with the stock temperature at 50° C. The basis weight was 25 pounds per 3000 ft. The graft copolymer prepared in the above examples and Hercobond™ 1000 were added as dry strength agents to the wet end of the papermaking machine at the level of 0.4 weight % of polymer active versus dry paper pulp. Unless otherwise indicated, PerForm® PC 8713 flocculant (Ashland Incorporated, Wilmington, Del.) was added to the wet end of the paper machine in the amount of 0.0125% of dry pulp. Dry tensile (TAPPI Test Method T494, om-01) and wet tensile properties were determined. The dry tensile properties of the paper sheets made with the examples of the present invention were compared with that made with Hercobond™ 1000, and are expressed as % versus that of Hercobond™ 1000 in Table IV.

TABLE IV

Strength Performances of the graft polyacrylamide on paper sheets

| Products | Compositions (Molar ratio) | Dry Tensile % | Wet Tensile % |
|---|---|---|---|
| Benchmark | GPAM (Hercobond ™ 1000) | 100 | 100 |
| Example 1-1 | PVAm/APTAC-g-PAM (10/0.4/90) | 101.2 | 81.4 |
| Example 1-2 | PVAm/APTAC-g-PAM (14/0.56/84) | 110.4 | 96.5 |
| Example 1-3 | PVAm/APTAC-g-PAM (16/0.64/84) | 115.2 | 74.8 |
| Example 1-4 | PVAm/APTAC-g-PAM (16/0.16/84) | 106.6 | 63.5 |
| Example 1-5 | PVAm/APTAC-g-PAM (15/0.15/85) | 105.3 | 63.8 |
| Example 1-6 | PVAm/APTAC-g-PAM (14/0.14/86) | 105.2 | 60.8 |
| Example 2-1 | PVAm-g-PAM (10/90) | 96.3 | 75.4 |

TABLE IV-continued

Strength Performances of the graft polyacrylamide on paper sheets

| Products | Compositions (Molar ratio) | Dry Tensile % | Wet Tensile % |
|---|---|---|---|
| Example 2-2 | PVAm-g-PAM (15/85) | 106.0 | 121.9 |
| Example 3-1 | PVAm-g-PAM (20/80) | 107.5 | 152.7 |
| Example 3-2 | PVAm-g-PAM (25/75) | 147.7 | 185.5 |
| Example 3-3 | PVAm-g-PAM (50/50) | 151.8 | 175.4 |
| Comparative Example 1 | PVAm and PAM blend (20/80) | 98.9 | 168.0 |

The data in Table IV was evaluated using 0.4 weight % of active polymer versus dry paper pulp unless otherwise indicated.

Table IV compares several representative graft copolymers of the present invention with a glyoxalated polyacrylamide, Hercobond™ 1000. All the graft copolymers of acrylamide and the acrylamidopropyltrimethylammonium chloride (APTAC) functionalized polyvinylamine base polymers at different levels evaluated (Example 1-1 to 1-6) gave improved dry tensile relative to Hercobond™ 1000 at the equal active basis. The graft copolymers (Example 1-1 to 1-6) of the present invention also gave lower wet tensile than the glyoxalated polyacrylamide, Hercobond™ 1000. The graft copolymer compositions of the present invention (Examples 1-2 to 1-6) also provided higher dry tensile than the graft copolymers of acrylamide and polyvinylamine base polymers that were not functionalized with APTAC but contained a similar amount of primary amine from polyvinylamine at 15-20 mole % (Examples 2-1, 2-2 and 3-1). The graft copolymer with the base polyvinylamine not being functionalized by APTAC (Example 3-1) had higher dry tensile than (107.5% vs. 98.8%) Comparative Example 1, was prepared by blending a polyacrylamide with polyvinylamine at the same active solids basis.

Example 5

Table V, demonstrates that blending a small amount of cationic aqueous dispersion polymer (Perform™ PK 2320) into a PVAm/APTAC-g-PAM polymer solution results in a product with surprisingly enhanced drainage (examples 5-2, 5-3 and 5-4 as compared to 5-1 with no cationic dispersion addition).

TABLE V

Polyacrylamide graft APTAC functionalized polyvinylamine and cationic aqueous dispersion blends

| Examples | APTAC mole % vs Polyvinylamine | Polyvinylamine/ Acrylamide (molar ratio) | PK2320 (wt %)* | PVAm/ APTAC-g-PAM (wt %)* | Drainage Index |
|---|---|---|---|---|---|
| 5-1 | 1.0 | 21:79 | 0 | 0.2 | 126 |
| 5-2 | 1.0 | 21:79 | 0.0125 | 0.2 | 151 |
| 5-3 | 1.0 | 21:79 | 0.025 | 0.2 | 166 |
| 5-4 | 1.0 | 21:79 | 0.05 | 0.2 | 192 |
| HB6363 | — | — | — | 0.2 | 204 |

*active polymer versus dry paper pulp

Tables VI and VII contain comparative examples of Polyacrylamide graft APTAC functionalized polyvinylamine (PVAm/APTAC-g-PAM) polymers combined with co-additives like bentonite (Bentolite H available from BYK Additives Inc., Gonzales, Tex.) and colloidal silica (Perform® 9025 available from Solenis, LLC, Wilmington, Del.) which are commonly used inorganic particulate drainage aids in the paper industry. Table VIII contains comparative examples of PVAm/APTAC-g-PAM polymers with added cationic dispersants, coagulants, or flocculants such as PerForm® PC 8229, Prestafix®PC125, and Prestafix®PC1229 available from Solenis, LLC, Wilmington, Del. Table VI, shows only a small improvement when bentonite is added to the stock with PVAm/APTAC-g-PAM polymers; unlike the large drainage improvements demonstrated in Table V. It was not possible to make a stable single product blend with silica because the colloidal silica readily precipitated out in the presence of the polymer solutions. The data shown in Table VII, represents the drainage index for co-additive compositions of PVAm/APTAC-g-PAM polymers and colloidal silica. The DI is reduced with added silica. Table VIII, demonstrates that alternative fixatives, coagulants, and flocculants do not provide the synergistic drainage performance of adding the PVAm/APTAC-g-PAM polymers with a cationic aqueous dispersions as shown in Table 5.

TABLE VI

Polyacrylamide graft APTAC functionalized polyvinylamine with Bentonite Co-Additive

| Comparative Examples | APTAC (mole % vs Polyvinylamine) | Polyvinylamine/ Acrylamide (molar ratio) | Polymer Dosage (wt %)* | Bentonite co-add (wt %)* | Drainage Index |
|---|---|---|---|---|---|
| 6-1 | 1.7 | 15:85 | 0.2 | 0.4 | 115 |
| 6-2 | 1.7 | 25:75 | 0.2 | 0.4 | 123 |

*active product versus dry paper pulp

TABLE VII

Polyacrylamide graft APTAC functionalized polyvinylamine (1.0 mole % APTAC, 21:79 PVAm:AM ratio) with Silica Co-Additive

| Comparative Examples | PVAm/APTAC-g-PAM (wt %)* | Silica Dosage (wt %)* | Drainage Index |
|---|---|---|---|
| 7-1 | 0.2 | — | 126 |
| 7-2 | 0.2 | 0.05 | 121 |
| 7-3 | 0.2 | 0.1 | 111 |
| 7-4 | 0.2 | 0.2 | 115 |

*active product versus dry paper pulp

TABLE VIII

Polyacrylamide graft APTAC functionalized polyvinylamine (1.0 mole % APTAC, 21:79 PVAm:AM ratio) with Alternate Co-Additives

| Comparative Examples | PVAm/APTAC-g-PAM (wt %)* | Cationic Co-Additive | Cationic Additive Dosage (wt %)* | Drainage Index |
|---|---|---|---|---|
| 8-1 | 0.2 | None | None | 126 |
| 8-2 | 0.2 | PC 1279 | 0.050 | 116 |
| 8-3 | 0.2 | PC 8229 | 0.025 | 115 |
| 8-4 | 0.2 | PC 125 | 0.050 | 111 |

*active product versus dry paper pulp

Example 9

The results shown in Table IX, demonstrates the good gelation stability of the polyacrylamide graft functionalized vinylamine polymer (PVAm/APTAC-g-PAM) blended with a cationic amide-containing aqueous dispersion, such as, PK2320. To form the blended single product, the PK2320 dispersion was slowly mixed into the polyvinylamine polymer solution at the wt % active listed in the Table. For instance, in example 9-1, 8.2 g of PK2320 at 28.7% polymer actives was blended with 91.8 g PVAm/APTAC-g-PAM polymer solution at 10.3% active to form the blend wherein the w % active PK 2320 is 20% of the total active polymer in solution. As shown for comparison in 9-2 and 9-3, compositions of an APTAC functionalized polyvinylamine which have not been grafted with acrylamide and blended with similar cationic dispersion actives, gel within 14 days of preparing.

TABLE IX

Visual aging of Single Blended Products

| Examples | Polyvinylamine Polymer | PK2320 (wt %)* | 1 month at 40° C. |
|---|---|---|---|
| 9-1 | PVAm/APTAC-g-PAM (21/1.0/79) | 20.0 | Homogeneous fluid |
| Comparative 9-2 | PVAm/APTAC (100/1.0) | 17.5 | Gel |
| Comparative 9-3 | PVAm/APTAC (100/1.0) | 21.3 | Gel |

*wt % active in the Blended Single product

Example 10. Combination to Provide Synergistic Wet Strength

The combinations of Example 10, as well as the separate additions, were evaluated in handsheets prepared from 70:30 blend of hardwood:softwood pulp beaten to a consistency of 2-2.5% in a cycle beater to 500 cc Canadian Standard Freeness. Papermaking was at pH 6.0 using a Noble and Wood handsheet apparatus. Table X summarizes the results from the handsheet evaluation.

The percent resin incorporated into the handsheets was based on dry active weight of additive for dry weight of pulp fiber. Hercobond™ 1194 temporary wet-strength additive is a glyoxalated cationic polyacrylamide resin (GPAM resin) (supplied by Solenis LLC, Wilmington, Del.). This additive was used as a control and in combination with Example 1-6. The basis weight of the handsheets was 40 lbs/3000 sq. t. The handsheets were dried to a moisture content of about 4-6% and allowed to natural age for a minimum of 2 weeks at 25° C. and 50% relative humidity. The handsheets were tested for both dry strength and for temporary wet strength using distilled water following Tappi Method 494. The results were basis weight normalized. Temporary wet strength testing included 10 seconds, 5 minutes, 30 minutes and 2 hours soaks.

TABLE X

Dry and wet tensile strength of Hercobond™ 1194 and Example 1-6.

| Example | First Additive | % Added | Second Additive | % Added | % Dry Tensile | 10 sec % Wet Tensile | 5 min % Wet Tensile | 30 min % Wet Tensile | 2 hour % Wet Tensile | % Synergistic 10 sec Wet Tensile | % Synergistic 5 min Wet Tensile | % Synergistic 30 min Wet Tensile | % Synergistic 2 hour Wet Tensile |
|---|---|---|---|---|---|---|---|---|---|---|---|---|---|
| 10-1 | Blank | — | — | — | 100 | 100 | 100 | 100 | 100 | — | — | — | — |
| 10-2 | Hercobond 1194 | 0.50 | — | — | 125 | 564 | 429 | 346 | 276 | — | — | — | — |
| 10-3 | — | — | Example 1-6 | 0.25 | 111 | 103 | 104 | 115 | 114 | — | — | — | — |
| 10-4 | Hercobond 1194 | 0.50 | Example 1-6 | 0.25 | 141 | 619 | 557 | 487 | 468 | 52 | 124 | 126 | 178 |
| 10-5 | — | — | Example 1-6 | 0.50 | 120 | 165 | 148 | 167 | 144 | — | — | — | — |
| 10-6 | Hercobond 1194 | 0.50 | Example 1-6 | 0.50 | 153 | 671 | 644 | 584 | 562 | 42 | 167 | 172 | 242 |

Example calculation:
Additive 2 hour wet tensile is calculated by adding the 2 hour wet tensile of Hercobond 1194 and of Example 1-6 and subtracting the blank Synergistic 2 hour wet tensile is calculated by subtracting the additive 2 hour wet tensile from the combination of Hercobond 1194 and Example 1-6

As can be seen from Table X, the combination of Hercobond™ 194 and Example 1-6 synergistically provides more wet strength than expected from just an additive effect of separate addition of the two products. This synergistic effect typically becomes more pronounced at longer soak times.

Example 11

Two-ply hand sheets were prepared with BCTMP pulp for one of the sheets and Kraft pulp for the other as is traditionally found in commercial folding boxboard applications. The sheets were sprayed at the interface with a 0.75% native spray starch dispersion as the control, and 0.75% native spray starch dispersion containing a glyoxylated polyacrylamide (Hercobond™ 1307 strength additive, supplied by Solenis LLC, Wilmington, DB). The BCTMP pulp contained either wet-end cationic starch or a graft copolymer of the invention. After spraying, the sheets were then couched together, pressed, and dried. The 2-ply sheets were tested for ZDT strength.

BCTMP pulp is bulky and weak in comparison to SW or HW Kraft due to the pulping process. In several applications where BCTMP is used for bulk and stiffness of a mid-ply, it necessary to add wet end strength additives to provide reinforcement and a minimum level of strength to make good paper or paperboard. It has been surprisingly found that when a graft copolymer of the invention is used together with a glyoxylated polyacrylamide; the composite strength is much greater than expected; and as compared to when the glyoxylated polyacrylamide is used in combination with other common strength additives like cationic starch. Table XI demonstrates a synergistic improvement in ZDT strength when an aldehyde functionalized polymer is used in combination with a graft copolymer of the invention.

TABLE XI

| Spray composition | Normalized % improvement over baseline as measured by ZDT Strength of 2-ply sheet | |
|---|---|---|
| | 1.0 wt % wet end Stalok 300 to BCTMP | 0.3 wt % wet end Example 5-1 to BCTMP |
| Control - 0.75 wt % native spray starch dispersion | 100 | 100 |

TABLE XI-continued

| Spray composition | Normalized % improvement over baseline as measured by ZDT Strength of 2-ply sheet | |
|---|---|---|
| | 1.0 wt % wet end Stalok 300 to BCTMP | 0.3 wt % wet end Example 5-1 to BCTMP |
| Example 11.1 - 0.75 wt % native spray starch dispersion with 0.38 wt % HB 1307 | 105 | 123 |

While the present invention has been described with respect to particular embodiments thereof, it is apparent that numerous other forms and modifications of this invention will be obvious to those skilled in the art. The appended claims should be construed to cover all such obvious forms and modifications which are within the true spirit and scope of the present invention.

What is claimed:

1. A method of improving wet and dry strength of a paper or paperboard comprising:
adding a graft copolymer composition of a vinyl monomer and a functionalized vinylamine-containing base polymer to a paper or paperboard furnish, wherein the functionalized vinylamine-containing base polymer comprises randomly distributed repeating monomer units having the formula (I), (II) and (III),

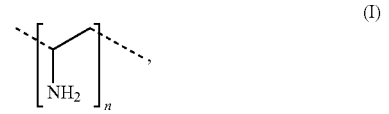

(I)

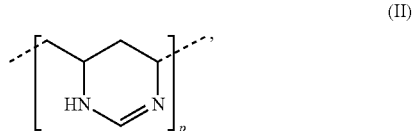

(II)

(III)

wherein R is a reacted α, β-unsaturated alkyl carbonyl compound through Michael addition by vinylamine in the polymer; n, p and q are the numbers indicating mole % of the repeating units of formula (I), (II) and (III) present in the functionalized vinylamine-containing polymer; and wherein n is from about 5 mole % to about 98 mole %, p is from about 1 mole % to about 80 mole %, q is from about 1 mole % to about 30 mole % the mole ratio of the functionalized vinylamine-containing base polymer to the vinyl monomer in the graft polymer is in the range of from about 10:90 to about 50:50; and forming the paper or paperboard.

2. The method according to claim 1, wherein the composition can be used in combination with one or more additives is selected from the group consisting of cationic, anionic, amphoteric, nonionic synthetic and natural polymers.

3. The method according to claim 2, wherein the anionic polymer is selected from the group consisting of a copolymer containing acrylic acid, a copolymer of acrylamide and acrylic acid, and a carboxyl methyl cellulose.

4. The method according to claim 2, wherein the cationic polymer is selected from the group consisting of crosslinked polyamidoamines, polydiallyldimethylammonium chlorides, and polyamines.

5. The method according to claim 2, wherein the one or more additives is selected from the group consisting of polymeric aldehyde-functional compounds.

6. The method according to claim 5, wherein the polymeric aldehyde-functional compound is selected from the group consisting of glyoxalated polyacrylamides, aldehyde celluloses and aldehyde functional polysaccharides.

7. The method according to claim 2, wherein the one or more additives can be an aqueous dispersion of a cationic amide-containing polymer.

8. The method according to claim 7, wherein the ratio of the active cationic amide-containing polymer to the vinylamine-containing graft copolymer is from about 2:98 to about 40:60.

9. The method according to claim 2, wherein the one or more additives is a cationic starch, an amphoteric starch or a combination thereof.

10. The method according to claim 2, wherein the ply bond strength of the paper is improved.

* * * * *